Dec. 11, 1951          H. M. GRAHAM                2,578,059
                       HEAT INTERCHANGER
Filed May 29, 1945                              3 Sheets-Sheet 1
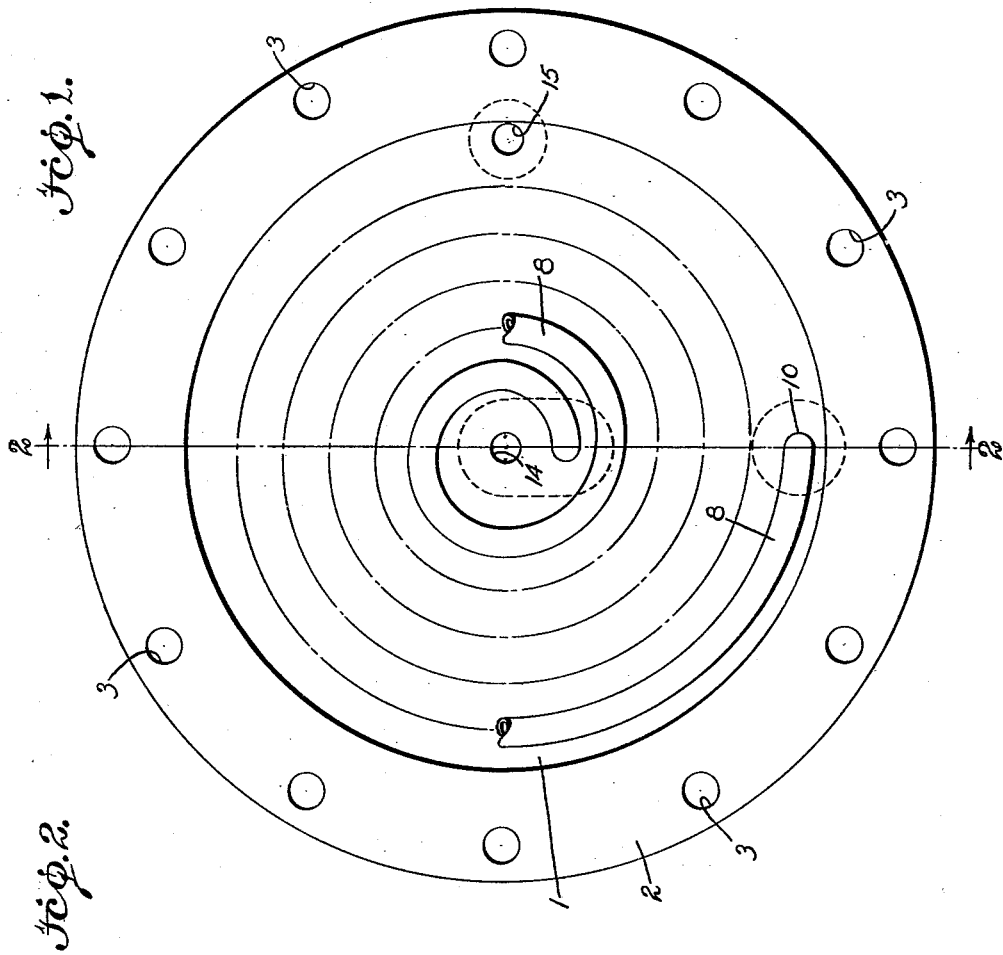
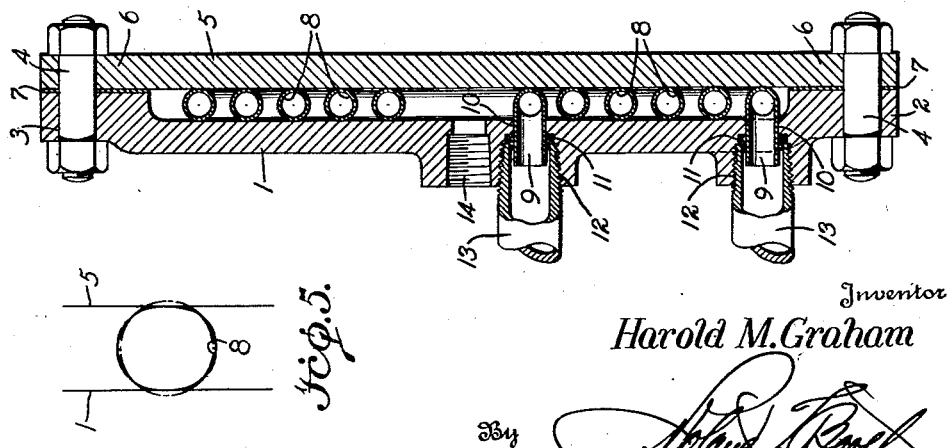
Inventor
Harold M. Graham Dec. 11, 1951  H. M. GRAHAM  2,578,059
HEAT INTERCHANGER
Filed May 29, 1945  3 Sheets-Sheet 2
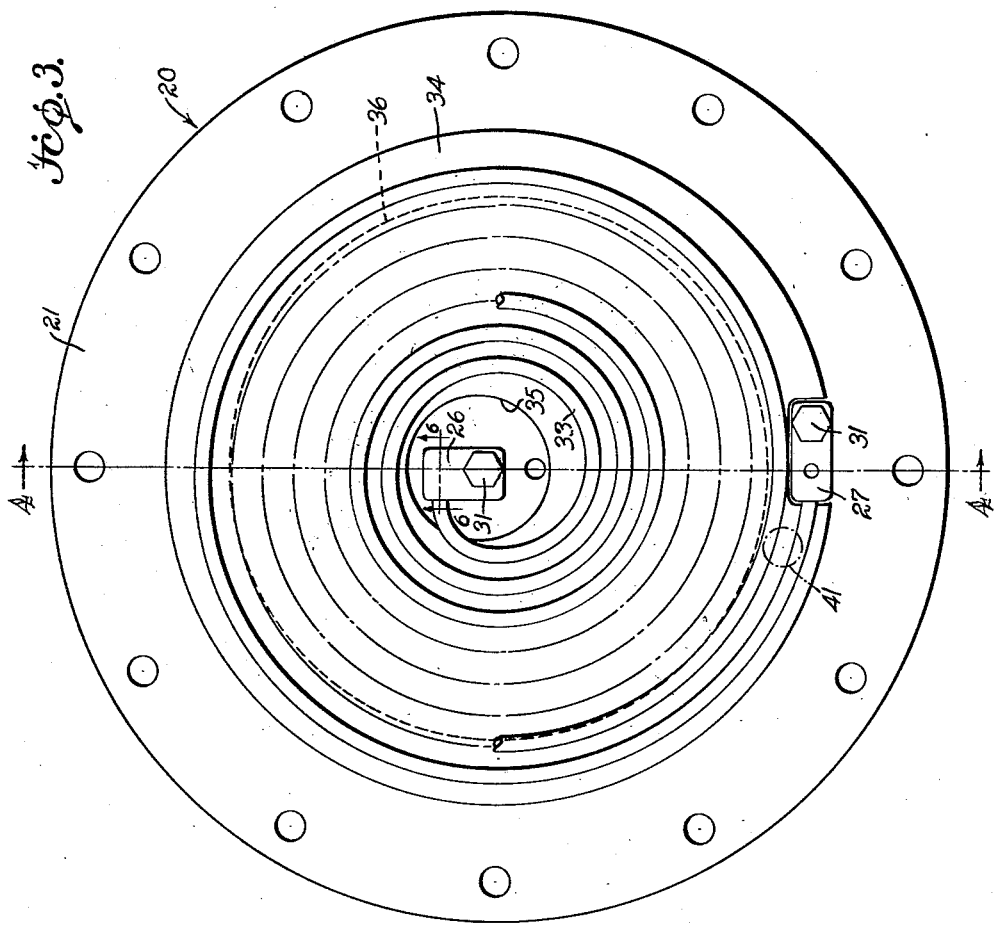
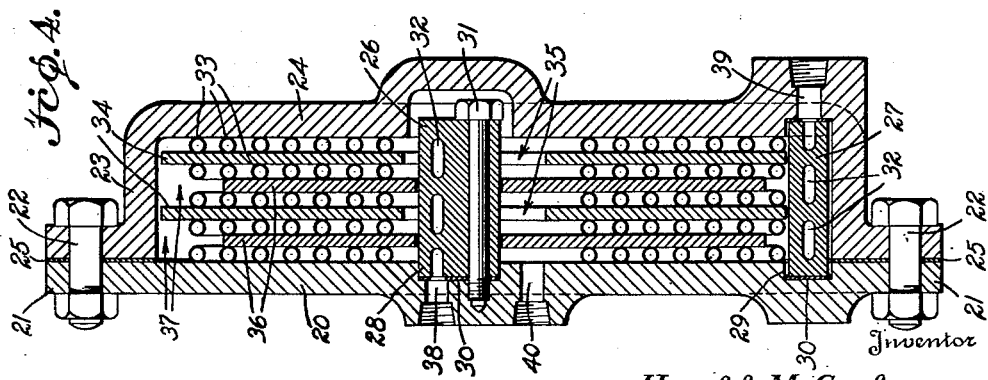
Inventor
Harold M. Graham
By
Attorney Dec. 11, 1951   H. M. GRAHAM   2,578,059
HEAT INTERCHANGER
Filed May 29, 1945   3 Sheets-Sheet 3
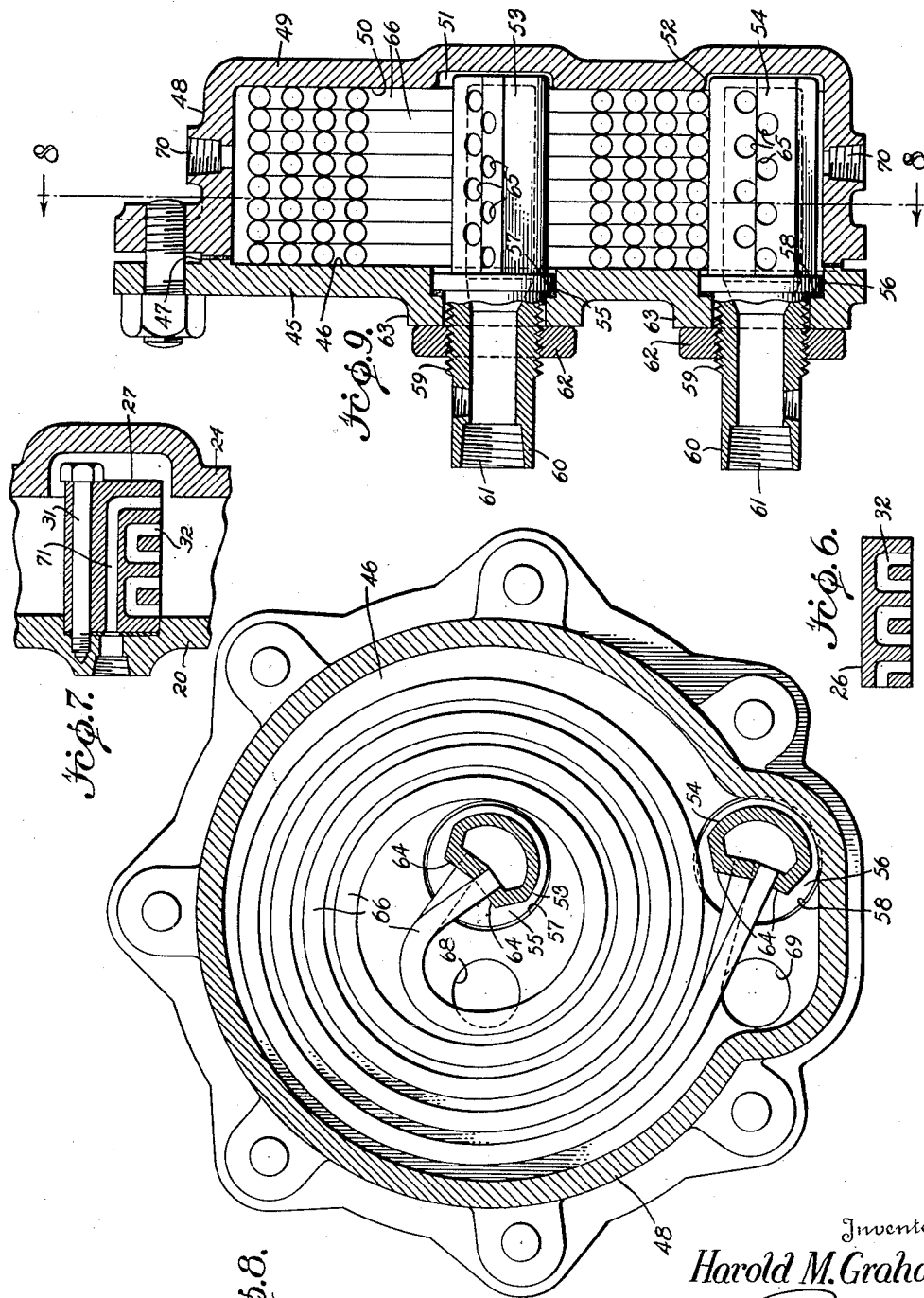
Inventor
Harold M. Graham
By
Attorney Patented Dec. 11, 1951

2,578,059

UNITED STATES PATENT OFFICE 2,578,059

HEAT INTERCHANGER

Harold M. Graham, Kenmore, N. Y., assignor to Graham Manufacturing Co., Inc., New York, N. Y., a corporation of New York Application May 29, 1945, Serial No. 596,428

2 Claims. (Cl. 257—229)

This invention relates to improvements in heat interchangers.

This application is in part a continuation of application for Letters Patent Ser. No. 556,735 filed October 2, 1944 and abandoned July 11, 1945.

The invention provides improvements in a heat interchanger designed to provide a conduit construction in unit form adapted to be detachably mounted on a supporting plate while a cover plate with marginal flange means may then be engaged over the conduit unit and assembled on the supporting plate to secure the supporting plate and cover together to compress the conduit unit into deformed relation with opposite portions of the conduit construction engaging the inner smooth surfaces of the supporting and cover plates under compression to provide a seal between the conduit, cover and supporting plates without using packing material. This provides for eliminating labor and reducing the cost of constructing heat interchangers and obtaining a construction that is efficient in operation. A heat interchanger embodying these features is also more readily disassembled for inspection and cleaning.

The invention provides a heat interchanger wherein the conduits have means on the ends detachably engaged with the supporting plate for detachably mounting the conduits on the supporting plate in assembled relation. Laterally extending ends on a spiral conduit slidably engaged in transverse openings in the supporting plate may provide manifolds and be detachably retained in the supporting plate by the telescoping end portions of pipe members compressing suitable retaining rings in sealing and retaining cooperation thereon. Where a plurality of conduits are used the invention provides for securing the ends to manifolds that may in turn be detachably secured to the supporting plate or cover and formed with communicating passages so that the interior of the conduits may have communication with pipe members connected to the manifolds.

The invention further comprehends the provision of a heat interchanger having a plurality of conduits assembled in symmetrical axial relation with or without separator plates and mounted on manifolds to provide a conduit assembly for detachable mounting on a supporting or cover plate for convenient assembly and servicing. A cover plate and cooperative flange means is mounted over the assembled conduits and separator plates to provide a sealed housing arranged with the effective dimension between the cover plate and supporting plate less than the assembled conduits, or conduits and separator plates, for compressing the conduits into deformed relation under pressure to provide a tight connection to prevent leakage of fluid past the conduits. The assembly of the cover plate on the supporting plate is of a detachable nature in providing the sealed housing so that it may be readily removed for cleaning the conduits and separator plates and providing for the ready removal of the conduits, separating plates and manifolds from the supporting or cover plates in order to provide an efficient but inexpensive heat interchanger construction.

The invention comprehends a heat interchanger having a sealed housing provided with a plurality of independent conduits having opposite ends connected to manifolds for detachably mounting the assembled conduits on a supporting plate with a plurality of separator plates arranged between adjacent conduits. Intermediate separator plates are slidably engaged on one manifold and spaced from the other and the inner walls of the housing while alternate separator plates engage the other manifold and closely fit the inner walls of the housing and terminate in spaced relation to the first-mentioned manifold for cooperation with the symmetrical axially arranged conduits to provide spiral passages outside of the conduits through said housing from the supporting plate to the cover plate extending alternately inward and then outward to form a serial passage of substantial length through the housing.

The invention provides for using a plurality of conduits of suitable size and number in a housing with opposite portions of the conduits engaged with each other and smooth inner walls in said housing. The conduits may be spaced by partitions arranged therebetween to separate said conduits either in groups or individually, and the conduits may be connected to the manifolds for providing a passage therethrough either in series or parallel or a combination of series and parallel connections to secure the desired flow capacity through said conduits.

In the drawings:

Fig. 1 is an elevation showing a heat interchanger supporting plate from which the cover plate has been removed with a conduit in assembled relation thereon.

Fig. 2 is a cross-section taken on line 2—2 of Fig. 1.

Fig. 3 is an elevation of a modified heat interchanger construction with the cover plate removed showing the supporting plate and a plurality of conduits and separator plates mounted on manifolds detachably secured to the supporting plate.

Fig. 4 is a cross-section taken on line 4—4 of Fig. 3.

Fig. 5 is a diagram showing how a conduit is deformed in providing a direct seal in contact with the cover and supporting plates.

Fig. 6 is a cross-section taken on line 6—6 of Fig. 3 through the inner manifold.

Fig. 7 is a cross-section through a manifold like manifold 27 in Fig. 3 illustrating how the outer manifold may be constructed to provide a passage so the fluid from the outermost conduit may be circulated through an outlet in the plate member instead of the cover.

Fig. 8 is a cross-section taken approximately on line 8—8 of Fig. 9 of another heat interchanger construction to show the supporting plate and a plurality of conduits without separator plates carried by a pair of manifolds.

Fig. 9 is a vertical cross-section through the manifold portion of the interchanger shown in Fig. 8 with the manifolds shown partly in elevation and partly in cross-section.

A supporting plate 1 is illustrated in Figs. 1 and 2 in the form of a substantially flat circular plate having peripheral securing flange means 2 forming a one-piece construction. A plurality of apertures 3 are formed in flange means 2 of plate 1 to receive a plurality of securing bolts 4 adapted to secure a cover plate 5 thereto formed with peripheral margins 6 engaged in superimposed relation with flange means 2 on plate 1 and having a packing washer 7 engaged therebetween to provide a sealed housing. The inner face of supporting plate 1 has a smooth flat inner surface which is unobstructed throughout its entire area. The inner surface of cover plate 5 also has a flat, smooth inner surface. These flat, smooth inner surfaces of plates 1 and 5 engage opposite side portions of spiral conduit 8 throughout the length of all of the convolutions thereof in direct contact therewith. The inner and outer ends of spiral conduit 8 have laterally extending end portions 9 forming manifolds slidably engaged in transversely extending apertures 10 formed in plate 1. The outer end portion of each aperture 10 is formed with an enlarged gasket seat 11 and enlarged internally threaded portion 12 for detachably receiving pipe 13 having an end portion engaged in telescoping relation over the free end 9 of conduit 8 to engage and compress a gasket in gasket seat 11 into tight retaining engagement with a laterally extending end 9 for retaining conduit 8 in assembled relation on plate 1. Conduit 8 divides the chamber within the housing between plates 1 and 5 into a spiral passage outside of the conduit between the convolutions thereof. At the inner end of conduit 8 in the central portion of the heat interchanger a laterally extending port 14 is formed in plate 1 while another laterally extending port 15 is provided at the outer edge of plate 1.

The transverse dimension of the flange means providing for the assembly of cover 5 on plate 1 between the inner faces of plates 1 and 5 is slightly less than the transverse outside dimension of conduit 8. This difference in dimension is provided in order that cover plate 5 in being secured to plate 1 to form a fluid-tight housing will have plate 5 operate in conjunction therewith to slightly deform conduit 8 throughout its length, from its original circular shape into a slightly flattened oval shape in cross-section, as shown diagrammatically in Fig. 5, in which opposite side portions are brought toward each other and the entire length of the spiral portion of conduit 8 is firmly compressed between and in contact with the inner faces of plates 1 and 5. This construction of the housing and conduit 8 provides an effective means for sealing the interchanger throughout the points of contact of conduit 8 with plates 1 and 5 to provide a spiral passage from the central portion to the outer periphery of the housing and prevent leakage of fluid across the convolutions of the conduit from one side to the other.

Conduit 8 is readily assembled on supporting plate 1 by merely sliding laterally extending ends or manifolds 9 through apertures 10. After the gaskets are seated in gasket seats 11 the securing of pipes 13 in plate 1 effectively mounts conduit 8 in assembled relation on plate 1. By removing the cover through removing the nuts from bolts 4, inspection, cleaning and disassembly of the heat interchanger can be readily accomplished in a convenient manner and with a minimum of labor. Ports 14 and 15 provide for pipe connections so that two fluids may be passed through the heat interchanger for the heating or cooling of one by the other. The flow of the fluid through conduit 8 may be in a direction opposite to that in the spiral space between the convolutions of the conduits outside thereof and within the housing in order to obtain a counter-current circulation of the two fluids with respect to each other for efficient heat exchanging operation.

Whenever a heat exchanger containing a single spiral conduit of the character shown in Figs. 1 and 2 is found inadequate for the desired heat exchange operation, a structure constructed as shown in Figs. 3 and 4 for example, may be used in accordance with the present invention.

A supporting plate 20, as shown in Figs. 3 and 4, has margins 21 formed with a plurality of perforations to receive securing bolts 22 for securing peripheral flange means 23 of cover plate 24 thereto with a packing washer 25 therebetween to provide a sealed housing. The inner faces of supporting and cover plates 20 and 24 respectively, are flat, smooth and arranged in spaced substantially parallel relation. Inner and outer manifolds 26 and 27 respectively, have their ends detachably engaged in sockets 28 and 29 respectively, formed in supporting plate 20 and sealed in the bottom of the sockets by gaskets 30. Cover 24 also is provided with sockets to receive the opposite ends of manifolds 26 and 27, as shown in Fig. 4. Securing bolts 31 rigidly secure manifolds 26 and 27 to supporting plate 20. Manifolds 26 and 27 are each provided with a plurality of transversely extending apertures therein at spaced intervals having adjacent pairs interconnected by passages 32.

A plurality of spiral conduits 33 have the opposite ends thereof engaged in the transverse apertures in inner and outer manifolds 26 and 27, respectively. These ends are suitably secured in manifolds 26 and 27 by soldering, brazing or the like, to rigidly attach the ends of all of the conduits on said inner and outer manifolds. These conduits 33 are of convolute spiral form with all of the convolutions lying in the same plane and having the same size so that when they are secured to inner and outer manifolds 26 and 27 the convolutions of all of the conduits 33 are in symmetrical relation and axially aligned as clearly shown in Figs. 3 and 4.

A plurality of separator plates are engaged between adjacent conduits 33 as shown in Fig. 4. Intermediate separator plates 34 have the outer periphery slidably engaged in flange means 23 of cover 24 and closely engaging about outer manifold 27. The inner periphery of each intermediate separator plate 34 is arranged in spaced relation from inner manifold 26, as shown in Fig. 4, to provide a passage at the central portion of the interchanger from one side of each intermediate separator plate to the other side as indicated by the numeral 35. Alternate separator plates 36 have the outer periphery thereof arranged in spaced relation to flange means 23 and the inner periphery arranged to slidably fit the outer periphery of inner manifold 26 so that passage is provided between the space within the interchanger casing from one side of each alternate separator plate 36 to the other side thereof beyond the outer periphery, as indicated at 37 in Fig. 4.

Inner manifold 26 has one of the passages 32 therein providing communication between the inner end of spiral conduit 33 adjacent supporting plate 20 and an inner port 38 formed in laterally extending relation through supporting plate 20. A pipe connection may be made to supporting plate 20 to provide a fluid supply through port 38 to the interior of conduits 33. Passages 32 in manifolds 26 and 27 (see Fig. 6) are arranged so that fluid passing through conduits 33 will flow from the inner end of the first conduit 33 adjacent supporting plate 20 to the outer end thereof into a passage 32 formed in outer manifold 27 at the left-hand side of Fig. 4 and then into the outer end of the next adjacent conduit member 33. The fluid then flows inwardly to the inner manifold 26 and through a passage 32 formed therein to the next adjacent conduit member and outwardly therethrough to outer manifold 27. Fluid therefore flows serially through all spiral conduits 33 and to the outer end of conduit 33 contacting cover plate 24 into outer manifold 27 and through an end port 32 therein, as shown in Fig. 4, communicating with a transverse passage formed in cover plate 24, as indicated at 39. Cover plate 24 is formed to provide for the convenient detachable connection of a pipe therewith in connection with the circulation of fluid in series through conduits 33.

The space between the several conduits 33 within the housing formed by the sealing of cover plate 24 to supporting plate 20 by flange means 21 and 23 provides a spiral serial passage outside of conduits 33 between each intermediate and alternate separator plate and cover plates 20 and 24. An inner port 40 formed in laterally extending relation in supporting plate 20 communicates with the interior of the housing outside of conduits 33 so that fluid may flow alternately in spiral relation to the outer edge of alternate and intermediate separator plates 34 and 36 and then inwardly in spiral relation between the convolutions of a conduit 33 to the inner edge of separator plates 34 and 36. Then the fluid flows outwardly again in spiral relation. In this way the fluid alternately flows outwardly and through passages 37 and then inwardly and through passages 35 about each of the separator plates and between conduits 33 in spiral relation. In this way a circuitous series passage is provided through the sealed housing between inner port 40 and an outer port 41 formed in cover plate 24.

The lateral dimension between the inner walls of supporting plate 20 and cover plate 24 and the transverse dimension of securing means 21 and 23 is less than the aggregate transverse dimension of all of conduits 33 and separator plates 34 and 36, in order that all conduits 33 will be deformed out of their normal shape by substantial compression as diagrammatically illustrated in Fig. 5, so that opposite sides of each conduit throughout the length of the spiral portion thereof will engage the flat inner faces of supporting and cover plates 24 and flat opposite faces of separator plates 34 and 36 respectively, in intimate relation under pressure and provide an effective seal between the several plates and the conduits so that fluid will not leak from one portion of the spiral passage outside of one convolution of any conduit 33 across the conduit to the opposite side thereof. By this means efficient circulation through the circuitous path within the heat interchanger is provided for fluid outside of conduits 33 in order that efficient heat interchange between fluid in the passage outside of conduits 33 and fluid in the conduits may be obtained.

The two fluids passing through and outside of conduits 33 may be circulated in opposite directions to provide a countercurrent heat interchanger and the direction of circulation of each fluid may be changed to suit the conditions of operation desired.

A multiple conduit heat interchanger is shown in Figs. 8 and 9 that may be found preferable for some commercial uses over the construction shown in Figs. 3 and 4, for example, because it provides for the elimination of the separator plates and a type of interchanger construction having the conduits connected with the manifolds in parallel instead of series.

In Figs. 8 and 9 the supporting plate is indicated by the numeral 45 formed with a smooth uninterrupted inner wall 46 and flange means 47 on which the flange means 48 of the cover 49 is engaged with a suitable packing washer therebetween. Cover 49 has a smooth uninterrupted flat inner wall 50 in spaced parallel relation to wall 46. Cover 49 is formed with sockets 51 and 52 to receive the outer ends of inner and outer manifolds 53 and 54 respectively, in the manner shown in Fig. 9. The opposite ends of manifolds 53 and 54 have annular flanges 55 and 56 respectively, formed thereon in outwardly projecting relation for seating engagement in sockets 57 and 58 respectively, formed in the central and outer portions of supporting plate 45. The annular flanges 55 and 56 seat against suitable packing washers for sealing the conduits in supporting plate 45. Each of the manifolds has a reduced threaded extension 59 terminating in a tubular projecting portion of further reduced diameter indicated at 60 formed in the free end portion with an internal threaded section 61. Suitable lock nuts 62 are threaded on reduced threaded extensions 59 against bosses 63 formed on the outer face of supporting plate 45 for rigidly mounting manifolds 53 and 54 respectively, in rigid sealed relation with flanges 55 and 56 respectively, engaged in seats 57 and 58, as clearly shown in Fig. 9.

Each of the manifolds 53 and 54 is of duplicate construction and has a pair of radially arranged longitudinally extending flat sections 64 in obtuse angular relation slightly less than 180°, as shown in Fig. 8. These sections 64 are joined together at the center portion in integral relation. Each manifold has a curved portion extending from the opposite edges of sections 64 to provide a manifold of tubular construction in cross section and a longitudinally extending channel communicating with the tubular extension 60. These angular sections 64 are each formed with an aligned row of spaced apertures 65. The apertures in one section 64 are arranged in alternate relation to the apertures in the other section transversely of the manifolds and the space between the apertures in each section is equal to the size of an aperture so that the peripheries of the apertures in one section 64 will be tangent to transverse planes tangent to the peripheries of the alternate apertures in the other section. In this way, the ends of a plurality of tubular conduits 66 are formed with the ends of alternate conduits extending in acute angular relation to the ends of the intermediate conduits, as shown in Fig. 8. This angular relation is such that the ends of the conduits will engage in the two offset sets of openings 65 in the angular sections 64 in an arrangement in which the ends of alternate conduits are engaged in the openings in one section 64 and the angularly extending ends of intermediate conduits will engage in the openings 65 in the other angular section 64. It will be noted that this arrangement of the angular ends of alternate and intermediate conduits in both the inner and outer manifolds 53 and 54 is the same. This construction provides for bringing the adjacent peripheral or side portions of each conduit into adjacent contacting relation.

The apertures 65 in the manifold are in offset relation so that the apertures for receiving the end of one conduit will not intersect the apertures for receiving the ends of adjacent conduits. The angular relation of sections 64 is arranged so that apertures 65 and the ends of conduits 66 extend therethrough in substantially perpendicular relation. This provides a construction so that the conduits may have contact at the adjacent side portions throughout the length of each conduit with the exception of a short portion at the angularly extending end portion.

Conduits 66 are formed in symmetrical convolute spirals with all of the convolutions of each conduit lying in the same plane with each conduit symmetrically arranged with the others in the manner shown in Figs. 8 and 9 between the inner smooth walls 46 and 50 of the supporting plate and cover. The effective length of the flange means 47 and 48 on the supporting plate and cover respectively, is less than the aggregate diameter of all of the conduits so that when the cover is attached to supporting plate 45 in sealed relation, all of the convolutions of all of the conduits 66 will be deformed from their normal circular shape in cross-section into an oval shape in cross-section of the character shown diagrammatically in Fig. 5. This places the entire length of each conduit 66 with the exception of the angular ends, under compression so that it is in intimate contact with each adjacent conduit and the inner smooth walls 46 and 50 of the supporting plate and cover for sealing the passage between each convolution of the conduit so that a sealed spiral passage outside of the conduits is formed in the housing extending from the central portion to the outer portion thereof for the flow of fluid through the housing outside of conduits 66.

Supporting plate 45 is formed with inner and outer ports 68 and 69, as shown in Fig. 8, that communicate with the inner and outer portions of the spiral passage through the housing about the outer portions of conduits 66. These may be formed in supporting plate 45 in a manner well known in the art to provide for suitable pipe connections with the supporting plate in order that fluid of a desired character may be circulated through the spiral passage in the housing from the inner port 68 to the outer port 69, or vice versa. Suitable pipe connections are made with extensions 60 by threading the ends of the pipes into the threaded sections 61 of manifolds 53 and 54 respectively, in order that the conduits may have fluid of any suitable character passed therethrough for heat interchange with a fluid being passed through the spiral passage outside the conduit. The circulation of fluid within the conduits 66 may be counter-current to the circulation of the fluid in the spiral passage in the housing outside of the conduits.

It will be noted that in the arrangement of conduits 66 and the mounting thereof in manifolds 53 and 54, as shown in Figs. 8 and 9, that the conduits are arranged in parallel so that a large volume of fluid can be circulated through the heat interchanger.

In view of the disclosure in Figs. 3, 4, 8 and 9, it will be clear to one skilled in the art that the manifolds used in both forms of construction may have their connections varied to secure either a parallel circulation of fluid through the conduits from one manifold to the other, as shown in Figs. 8 and 9, or the manifolds may be arranged with passages constructed to conduct fluid serially through the several conduits, as shown in Figs. 3 and 4. It also will be understood that two or more conduits may be arranged in groups for circulation of fluid in parallel therethrough with each group of conduits connected to other groups in series so that a combination of parallel-series flow through the conduits can be obtained. Two or more conduits may be arranged in each group in parallel relation for obtaining a flow of a larger volume of fluid through the conduits. With two or more groups of conduits arranged in series the fluid may be passed through two or more sets of parallel arranged conduits in obtaining a desired amount of heat interchange with a larger fluid flow than would normally be accommodated by a single conduit. It will also be understood by those skilled in the art that the manifolds for the structure shown in Figs. 3 and 4 may be constructed and mounted in the supporting plate in a manner similar to the manifolds used in the structure disclosed in Figs. 8 and 9. The shape of the manifolds may be varied in a manner clearly disclosed by the illustrations in Figs. 3, 4, 8 and 9 to accommodate the desired condition of series of parallel flow through the conduit, or a series parallel flow, where such a combination may be desirable without departing from the spirit and scope of the invention herein disclosed and claimed.

Ports are indicated at 70 in Fig. 9 in the top and bottom portions of cover 49 to provide for pipe connections that may be used for the circulation of cleaning fluid through the heat interchanger or for draining and taking samples of the fluid therein from about the conduits without removing the cover.

In all forms of interchanger construction packing glands between the conduits and the supporting cover and separator plates is eliminated and the deforming of the spiral conduits retains all of the convolutions thereof in position between the cover and supporting plate in deformed relation so that they are maintained under constant tension at all times for holding all of the convolutions in position and at the same time sealing the convolutions with the cover, supporting and separator plates without the use of gaskets or other packing material. This provides a construction with the mounting of the conduits on the supporting plate so arranged that the cover may be conveniently applied and removed without disturbing the mounting of the conduits. This enables the cover to be removed for inspection of the conduits, the mounting thereof on the supporting plate and cleaning of the space outside of the conduits.

It is customary in the art to use two fluids in which one fluid is clean while the other may be dirty. In such a case the clean fluid is passed through the conduits and the dirty fluid in the space outside the conduits. In this case, it has been found necessary to clean the fluid passages outside of the conduits to secure efficient operation. With the present heat interchanger constructions, the removal of the cover provides for convenient inspection and cleaning of any foreign matter from the inside surfaces about the conduits in which the dirty fluid is normally circulated. In this way considerable saving in cost of construction, repair and servicing of the heat interchangers is obtained.

All of the pipe connections to the heat interchanger are shown in Figs. 1, 2, 8 and 9, as being formed in the supporting plate. It is to be understood that this also may be conveniently arranged in the structure shown in Figs. 3 and 4, through the provision of a return passage 71, see Fig. 7, in outer manifold 27 from the end of conduit 33 adjacent cover 24 to the end connected with supporting plate 20, which may be arranged in communication with a suitable transverse passage in the supporting plate to which a pipe connection may be made. By providing an additional port extending from the outer end portion of outer manifold 27 to another port formed in supporting plate 20, in which this other passage communicates with the space between cover plate 24 outside of the outer convolution of the adjacent conduit 33, the fluid in the space outside of the outer convolution of outermost conduit 33 may be returned to a suitable pipe connection secured to supporting plate 20. In this way all pipe connections with cover plate 24 may be eliminated in order that the cover plate may be conveniently attached and removed from supporting plate 20 without requiring disconnection of any of the connecting pipes for circulating either of the two fluids through the heat interchanger.

Figs. 1 to 4, 8 and 9 of the drawings do not show the compressed oval shape of the conduits because of the small scale of the drawings but it is to be understood that they are compressed and under tension in accordance with the diagrammatic illustration of Fig. 5.

The assembly of the cover on the supporting plate with the conduits in deformed oval shape under substantial pressure, as shown in Fig. 5, provides for the circulation of the two fluids in all forms of the interchanger under pressures approximating one hundred fifty pounds per square inch without leakage across the convolutions of the conduits.

The invention claimed is:
1. In a heat interchanger, the combination of a housing having a supporting plate formed with a flat smooth wall portion on the inner side thereof, a cover having a flat smooth wall portion in spaced parallel relation to said supporting plate wall portion, manifolds detachably mounted on said housing and extending transversely between said wall portions of said cover and supporting plate, a plurality of tubular spiral conduits each having a plurality of convolutions lying in a plane parallel to said wall portions with opposite sides of each conduit having direct contact with each other and said wall portions throughout substantially the entire length thereof, alternate conduits having the free end portions secured to said manifolds in offset relation to intermediate conduits, and flange means forming part of said housing connecting said cover and supporting plate having an effective transverse dimension less than that of said conduit means whereby each conduit is compressed into deformed relation under pressure into sealing engagement with said wall portions when said flanges are secured together in housing sealing relation.

2. In a heat interchanger, the combination of a housing having a supporting plate formed with a flat smooth wall portion on the inner side thereof interrupted only by a pair of manifold sockets, a cover having a flat smooth inner wall portion in spaced parallel relation to said supporting plate wall portion interrupted only by a pair of manifold sockets aligned with the sockets in said supporting plate, a pair of manifolds attached to said housing with the end portions engaged in said sockets, a plurality of tubular conduits of substantially circular shape in cross-section formed into a plurality of spiral convolutions lying in planes parallel to said wall portions with opposite side portions throughout the length thereof interengaged between said wall portions in direct contact with said wall portions and each other to provide a spiral passage in said housing outside of said conduits, the ends of intermediate conduits being secured in openings in said manifolds in offset relation to alternate conduits, and flange means forming part of said housing connecting said cover and supporting plate having an effective transverse dimension less than that of all of said conduits whereby each conduit is compressed into oval shape under pressure and into sealing engagement with each other and said wall portions when said flanges are secured together in housing sealing relation.

HAROLD M. GRAHAM.

REFERENCES CITED

The following references are of record in the file of this patent:

UNITED STATES PATENTS

| Number | Name | Date |
|---|---|---|
| 1,382,670 | Price | June 28, 1921 |
| 1,669,062 | Menzel | May 8, 1928 |
| 2,129,300 | Bichowsky | Sept. 6, 1938 |

FOREIGN PATENTS

| Number | Country | Date |
|---|---|---|
| 771,245 | France | Oct. 3, 1934 |
| 179,793 | Germany | Dec. 18, 1906 |
| 273,763 | Germany | May 6, 1914 |